United States Patent
Agarwal et al.

(10) Patent No.: US 8,744,991 B2
(45) Date of Patent: Jun. 3, 2014

(54) KNOWLEDGE ARTIFACT ANALYSIS SYSTEM AND METHOD

(75) Inventors: Ravi Agarwal, Pune (IN); Barath Sundaram, Chennai (IN); Aparna Ekambaram, Pune (IN)

(73) Assignee: Infosys Technologies Limited, Bangalore (IN)

( * ) Notice: Subject to any disclaimer, the term of this patent is extended or adjusted under 35 U.S.C. 154(b) by 1235 days.

(21) Appl. No.: 12/145,908

(22) Filed: Jun. 25, 2008

(65) Prior Publication Data

US 2009/0271357 A1   Oct. 29, 2009

(51) Int. Cl.
*G06N 5/02* (2006.01)
*G06F 17/00* (2006.01)

(52) U.S. Cl.
CPC . *G06N 5/02* (2013.01); *G06F 17/00* (2013.01)
USPC .......................................................... 706/50

(58) Field of Classification Search
CPC ............. G06N 5/02; G06F 17/00; G06F 1/00; G06F 2201/00; G06Q 30/0251
USPC ......................................... 209/12.1; 707/721
See application file for complete search history.

(56) References Cited

U.S. PATENT DOCUMENTS

| | | | |
|---|---|---|---|
| 6,484,163 B1 * | 11/2002 | Lawrence et al. | 707/776 |
| 2003/0144892 A1 * | 7/2003 | Cowan et al. | 705/8 |
| 2004/0139107 A1 * | 7/2004 | Bachman et al. | 707/104.1 |
| 2005/0204367 A1 * | 9/2005 | Minium et al. | 719/328 |
| 2006/0117012 A1 * | 6/2006 | Rizzolo et al. | 707/9 |
| 2007/0192266 A1 * | 8/2007 | Tiwari et al. | 706/45 |
| 2007/0192372 A1 * | 8/2007 | Bestgen et al. | 707/200 |
| 2008/0071939 A1 * | 3/2008 | Tanaka et al. | 710/18 |

OTHER PUBLICATIONS

'An assessmant and prioritization of "design for recycling" Guidelines for plastic components': Masanet, 2002, IEEE, 0-7803-7214, pp. 5-10.*

'Design for disassembly—Quantitative analysis software: Based on the parameters affecting disassembly': Subramanian, 2004, University of Cincinnati.*

* cited by examiner

*Primary Examiner* — Kakali Chaki
*Assistant Examiner* — Peter Coughlan
(74) *Attorney, Agent, or Firm* — LeClairRyan, a Professional Corporation

(57) ABSTRACT

A knowledge tracking and analysis system and method. The method may include: an artifact evaluator that receives various use parameters for each knowledge artifact, operates on the received use parameters, and generates respective parameter scores; and a knowledge index calculator that compiles parameter scores and generates a knowledge index indicative of use of the knowledge entities during the project. The system and method allow analysis and tracking of knowledge artifacts in future projects.

12 Claims, 9 Drawing Sheets

500

| PROJECT ID | INDEX VALUE(T1) | INDEX VALUE(T2) | INDEX VALUE(T3) |
|---|---|---|---|
| 1 | 6 | 12 | 12 |
| 2 | 5 | 18 | 14 |
| 3 | 18 | 17 | 18 |

*FIG.7*

KNOWLEDGE ARTIFACT ANALYSIS SYSTEM AND METHOD

BACKGROUND

1. Field

Embodiments of the present invention relate generally to knowledge management and, more particularly, to managing, tracking, analyzing and measuring how knowledge artifacts are used during a project.

2. Description of Related Art

Knowledge Management comprises a range of practices used by organizations to identify, create, represent, and distribute knowledge. Knowledge Management (KM) programs are typically tied to organizational objectives such as improved performance, competitive advantage, innovation, developmental processes, and the general development of collaborative practices.

Knowledge management typically utilizes KM applications (e.g. software applications) to categorize, store, and search knowledge artifacts. Knowledge artifacts are records of information, such as documents, that exist in a retrievable format for use by others. KM applications are generally usable to search for and retrieve records of knowledge artifacts so that they may be re-used or serve as examples for future reference.

BRIEF SUMMARY

The inventors have developed the "K_CUP" TM "Knowledge Consolidation, Usage and Progesss" TM system. According to an embodiment, there is provided a system for analyzing use of knowledge artifacts. This system includes: an artifact evaluator that receives various use parameters for each knowledge artifact, operates on the received use parameters, and generates respective parameter scores; and a knowledge index calculator that compiles parameter scores and generates a knowledge index based on the scores indicative of use of the knowledge artifacts during the project.

According to another embodiment, there is provided a method of analyzing how knowledge artifacts were used. This method includes: receiving use parameters relating to the knowledge artifacts; determining scores relating to the use of the knowledge artifacts, the scores being based on the received use parameters; and generating a use index for the knowledge artifacts, the use index indicating how the knowledge artifacts were used and being based on determined scores and other values.

According to still another embodiment, there is provided a method of analyzing use of knowledge artifacts. This method includes: entering input variables corresponding to the knowledge artifacts; computing scores for each knowledge artifact by processing the input variables corresponding to each respective knowledge artifact; and compiling at least some of the scores to obtain a report indicative of use of the knowledge artifacts.

The foregoing and other aspects will become apparent from the following detailed description when considered in conjunction with the accompanying drawing figures.

BRIEF DESCRIPTION OF THE DRAWINGS

FIG. 7 is a schematic representation of an example of a knowledge index of an embodiment.

DETAILED DESCRIPTION

Figure 1:
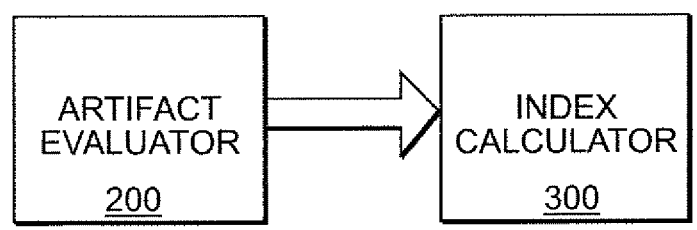
FIG. 1 is a schematic representation of an exemplary system according to an embodiment including an artifact evaluator and an index calculator.

It is desirable to manage and measure how knowledge is used during a period of time or for a project. For example, it may be desirable to ascertain how much knowledge is internal and how much is external. That is, how internal, in-house resources and knowledge were used compared to how much external, outside resources, such as consultants or outside counsel, and knowledge were used. Also, it may be desirable to manage knowledge by category. The embodiments described herein allow use of knowledge to be quantified with scores and index values as described below.

Reference will now be made in detail to embodiments, which are illustrated in the accompanying drawings, wherein like reference numerals refer to the like elements throughout. The embodiments are described below by referring to the figures.

As used in this application, the terms "a", "an" and "the" may refer to one or more than one of an item. The terms "and" and "or" may be used in the conjunctive or disjunctive sense and will generally be understood to be equivalent to "and/or". For brevity and clarity, a particular quantity of an item may be described or shown while the actual quantity of the item may differ. The term "project" can refer to a set of related activities, such as activities relating to a specific objective.

The embodiments described below provide information on how knowledge artifacts were used during a project. Such information may enable a project manager or other entity to determine, by way of non-limiting example, whether a project required much external knowledge from, for example, independent contractors or consultants. The user, with this information, may then, also by way of a non-limiting example, identify areas where internal knowledge may be weak and need improvement. This identification of potential areas for improvement may help an organization more efficiently distribute, deploy, acquire, and retain its resources.

A knowledge artifact may be any memorialization (i.e. record) of information, such as, by way of non-limiting examples, a document, an audio recording, or a video recording. Information can be obtained from documents, interviews, or any other source.

Referring now to FIG. 1, there is illustrated a schematic representation of an exemplary system 100, such as a computer system, according to an embodiment. The system 100 includes an artifact evaluator 200 and an index calculator 300.

The artifact evaluator 200 receives various parameters (i.e., input variables) relating to knowledge artifacts including the category, subcategory, scope, type, and sub-type of a knowledge artifact, along with a reuse value and an effectiveness value of the knowledge artifact. The various parameters may be input by a user through a user interface (not illustrated). Additionally or alternatively, the various parameters may be inputted in an automated manner. For example, the parameter can be input by querying a databox of parameters. In this embodiment, the following parameters are used.

1) Category—a classification of the artifact subject.
2) Sub Category—a sub classification of the artifact subject.
3) Scope—an indication of whether the artifact is of internal or external origin.
4) Reuse—an indication of whether the artifacts is being used for the first time or is being reused.
5) Effectiveness—an indication of the effectiveness of the artifact for its purpose (can be determined subjectively by an expert).
6) Number of Persons—number of persons participating, such as the number of persons on the project team.
7) Type—a categorization of the artifact form, such as document, repository record, meeting sessions, etc.
8) Sub Type—a sub categorization of the artifact form, e.g., from senior management, from a peer, from a consultant, etc.

Figure 2:
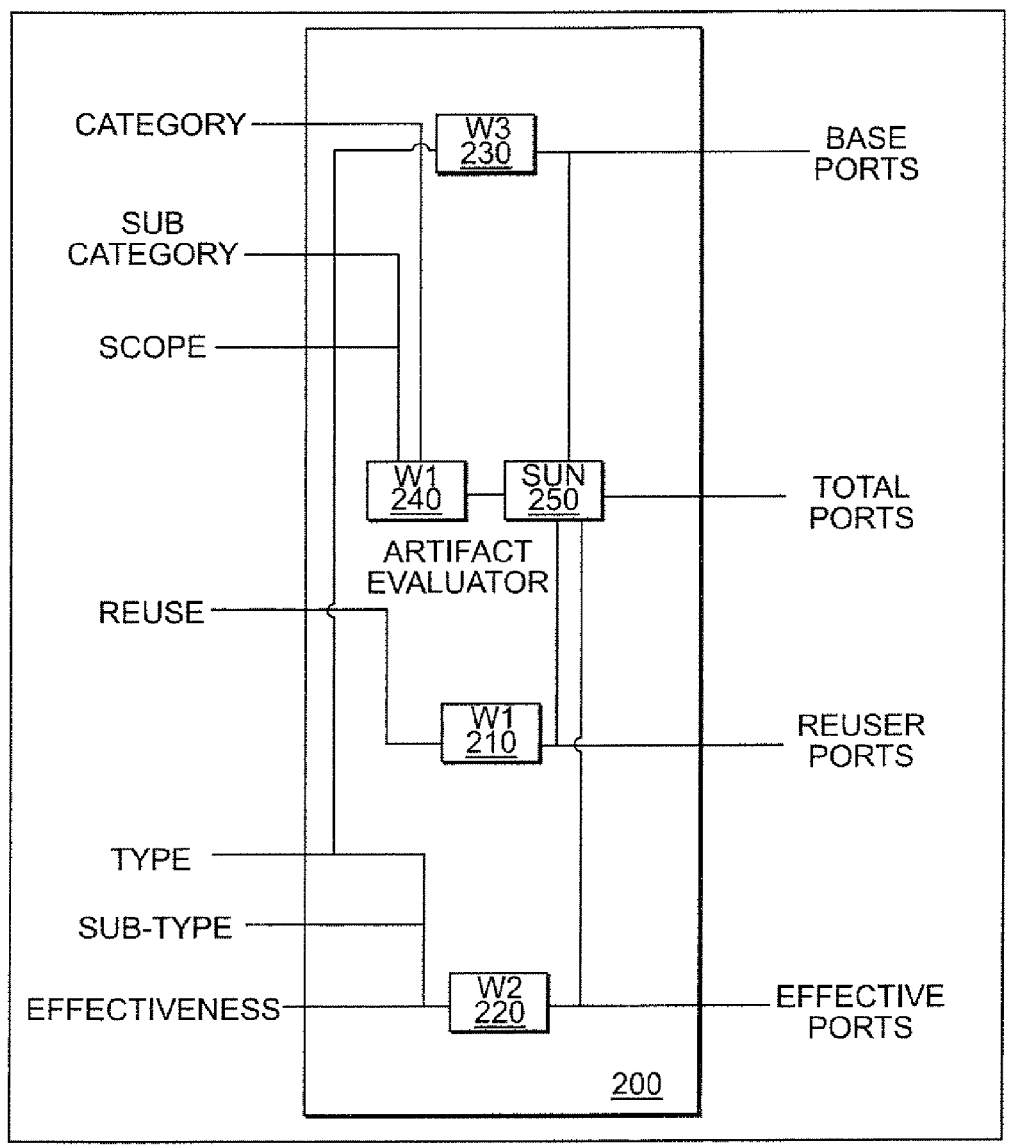
FIG. 2 is a schematic representation of the artifact evaluator of FIG. 1

Referring to FIG. 2, the artifact evaluator 200 is schematically illustrated in more detail. The artifact evaluator 200 includes various modules of logic, including: logic 210; logic 220; logic 230; and logic 240. The artifact evaluator 200 also includes sum logic 250.

Logic 210 receives and operates on the reuse parameter to generate a reuse score (i.e., reuse points). In more detail, logic 210 executes the following function w1 to generate the reuse score:

$w_1$ Return (If Y (yes) then A else 0), where A is a constant.

Logic 220 receives and operates on the type, sub-type, and effectiveness value to generate an effectiveness score (i.e., effectiveness points). In more detail, logic 220 executes the following function w2 to generate the effectiveness score:

$$w2 \text{ Return } ((MAX\_RANGE(Type,Subtype)-MIN\_RANGE(Type,SubType))*(effectiveness/100)*B)+MIN\_RANGE(Type,Sub Type),$$

where B is a constant and MAX_RANGE and MIN_RANGE are point ranges defined for the system 100.

Logic 230 receives and operates on the type parameter to generate a base score (i.e., base points). In more detail, logic 230 executes the following function w3 to generate the base score:

$$w_3 \text{ Returns } ((MAX\_RANGE(Type,Sub Type)-MIN\_RANGE(Type,Sub Type))*Q+MIN\_RANGE(Type,Sub Type),$$

where Q is a constant.

Logic 240 receives and operates on the category, subcategory, and scope parameters to generate an score output that is received by the sum logic 250. In more detail, logic 240 executes the following function w4 to generate the score output:

$$w_4 \text{ Returns } (\text{if scope=Internal then } D \text{ else } E)+CAT\_POINTS(category)+SUBCAT\_POINTS(subcategory),$$

where D and E are constants and CATPOINTS and SUBCAT_POINTS are point ranges defined for the system.

Sum logic 250 receives the score output from logic 240 and the reuse, effective, and base scores, aggregates these scores (i.e., points), and generates a total score (i.e., total points).

Figure 3:
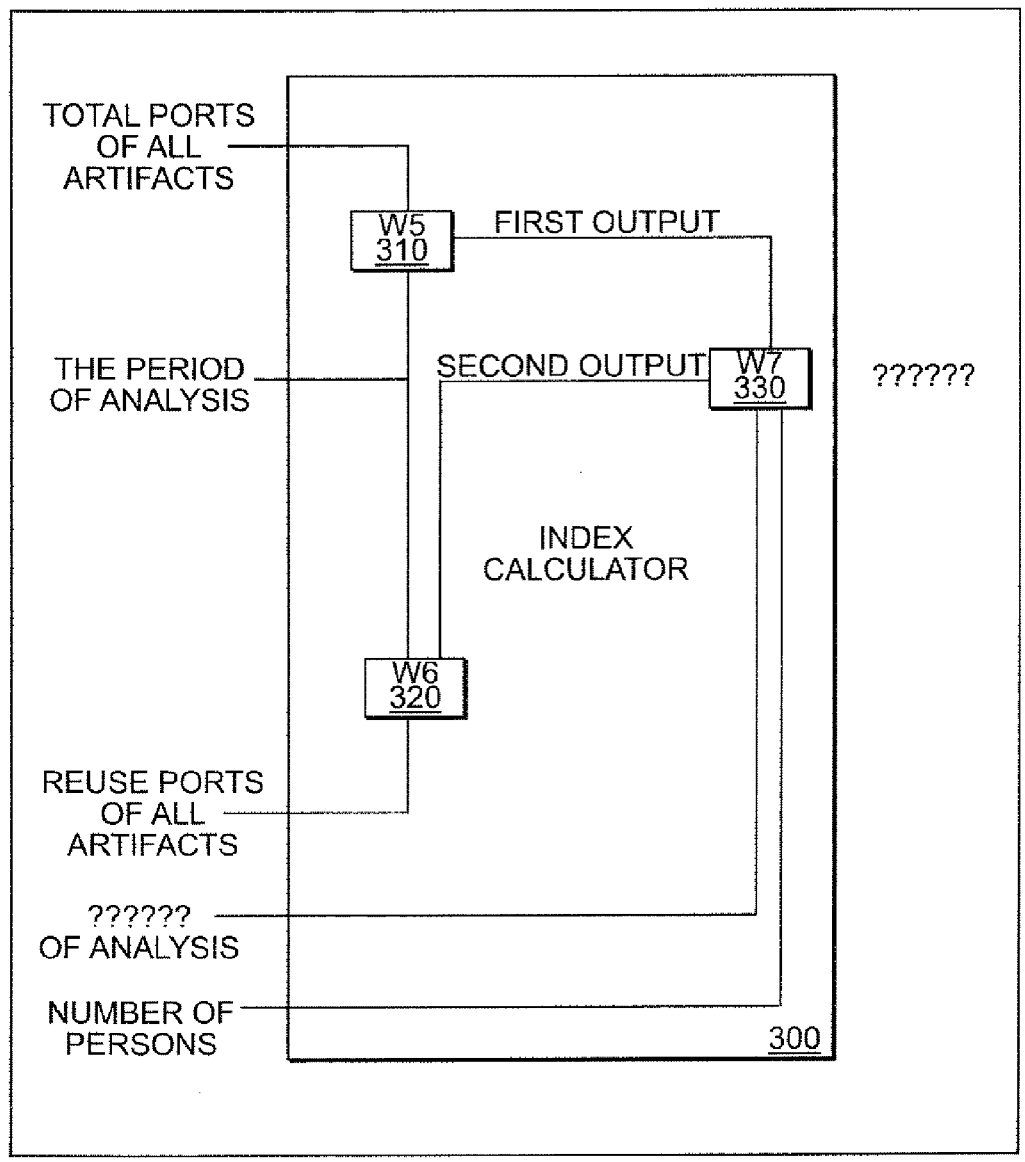
FIG. 3 is a schematic representation of the index calculator of FIG. 1

Referring to FIG. 3, the index calculator 300 of system 100 is illustrated in more detail. The index calculator 300 includes: logic 310; logic 320; and logic 330.

Logic 310 receives and operates on the total points and a time period for analysis value to generate a first qualification output. The qualification output qualifies only those knowledge artifacts that were submitted within the time period. Stated another way, logic 310 is an aggregator for qualified total scores.

Logic 320 receives and operates on the reuse points for all knowledge artifacts used in a project and a time period for analysis value to generate a second qualification output. Stated another way, logic 310 is an aggregator for qualified reuse scores.

Logic 330 receives and operates on the first and second qualification outputs, respectively from logic 310 and 320, using a specified hierarchy of analysis and a number of persons, to generate a knowledge index (Kcup index). In more detail, logic 330 executes the following function to generate the knowledge index:

$w_7$ Returns $$(F*(Total\_Points/No\_Of\_Persons))+(G*(Reuse\_Points/No\_Of\_Persons))+(H*No\_Of\_Persons)+(I*(Total\_Points/No\_Of\_Artifacts/No\_Of\_Persons))+(J*Total\_Points)+(K*Reuse\_Points)+L,$$

where F-L are constants.

It is to be appreciated the system described above is merely exemplary, and many modifications are both possible and contemplated. For example, other parameters may be received and used in addition to, or in place of, those discussed above. Further, the specific logic discussed above need not be discrete or operate on parameters in the manner described.

Figure 4:
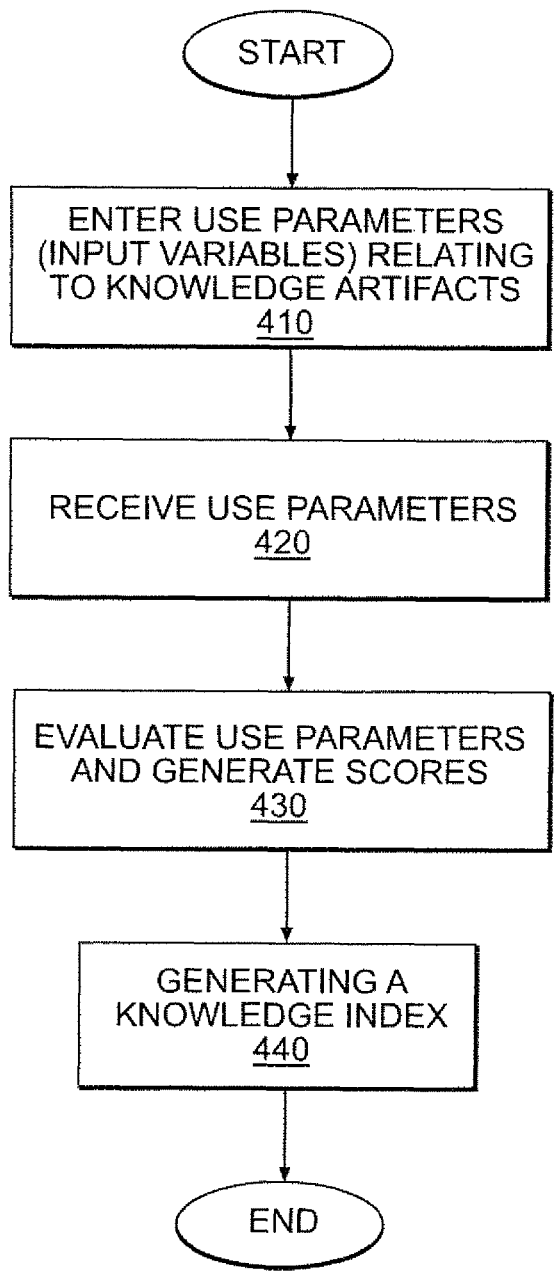
FIG. 4 is a flow chart of an exemplary method according to an embodiment.

Referring now to FIG. 4, a method 400 according to an embodiment for creating a knowledge index is illustrated. The knowledge index can be used to manage knowledge artifacts as discussed below. The method 400 includes the following operations: inputting various use parameters for a knowledge artifact (410); receiving, by logic, the various input parameters (420); evaluating input use parameters to generate various parameter scores (430); and generating a knowledge index for the knowledge artifact (440).

The method of FIG. 4 will now be described. For enhanced clarity and efficiency, as well as for ease of explanation, the description of method 400 is made with concurrent reference to the system 100 of FIGS. 1-3. It is to be understood, however, that the method 400 can be practiced by other systems.

In operations 410 and 420, various use parameters (i.e., input variables) including the category, subcategory, scope, type, and sub-type of a knowledge artifact, along with number of persons, a reuse value and an effectiveness value of the knowledge artifact, are input and then received by the logic, such as the logic 210-240 of FIG. 2. The various parameters may be input by a user through a user interface (not illustrated). Additionally or alternatively, the various parameters may be inputted in an automated manner.

In operation 430, the received parameters are evaluated and scores generated to create an index. Here, the parameters are operated on to generate various scores. The operations may, by way of non-limiting example, be operated on by logic, such as the logic 210-250 of FIG. 2.

Figure 5:
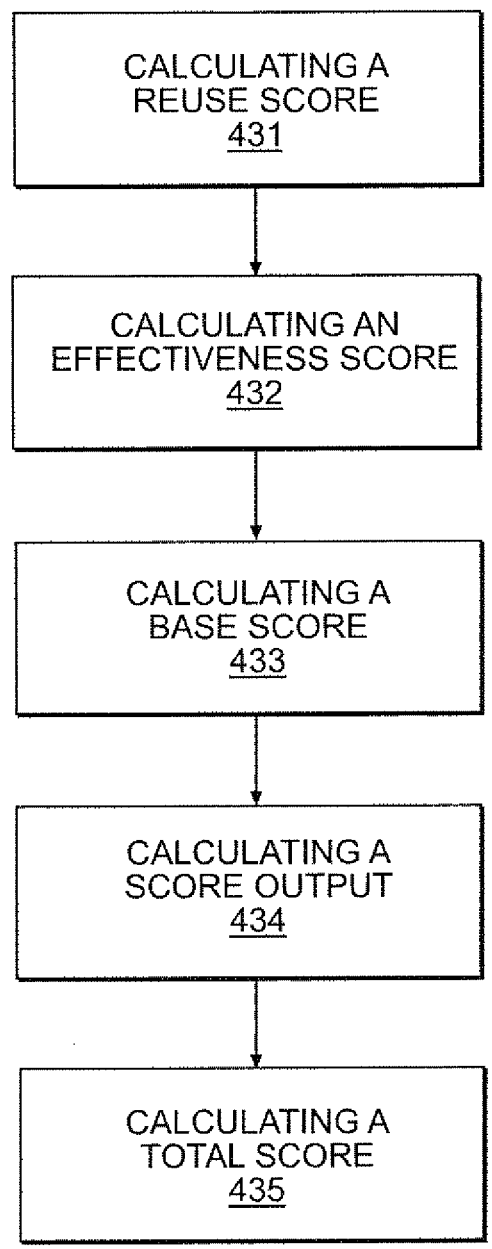
FIG. 5 is a detailed flow chart of operation 430 of the method of FIG. 4.

Referring now to FIG. 5, operation 430 is illustrated in greater detail to include the following operations: operation 431, in which a reuse score (i.e., reuse points) is calculated; operation 432, in which an effectiveness score (i.e., effectiveness points) is calculated; operation 433, in which a base score (i.e., base points) is calculated; operation 434, in which a score output is calculated; and operation 435, in which a total score (i.e., total points) is calculated.

In operation 431, for example, a first logic, such as logic 210 of FIG. 1, receives and operates on the reuse parameter to generate a reuse score (i.e., reuse points). Here, the first logic executes the following function w1 to generate the reuse score:

w1 Return (If Y (yes) than A else 0), where A is a constant.

In operation 432, for example, a second logic, such as logic 220 of FIG. 2, receives and operates on the type, sub-type, and effectiveness value to generate an effectiveness score (i.e., effectiveness points). Here, the second logic executes the following function w2 to generate the effectiveness score:

w2 Return ((MAX_RANGE(Type,Subtype)−MIN_RANGE(Type,SubType))*(effectiveness/100) *B)+MIN_RANGE(Type,Sub Type), where B is a constant and MAX_RANGE and MIN_RANGE are specified point ranges.

In operation 433, for example, a third logic, such as the logic 230 of FIG. 2, receives and operates on the type parameter to generate a base score (i.e., base points). Here, the third logic executes the following function to generate the base score:

w3 Returns ((MAX_RANGE(Type,Sub Type)−MIN_RANGE(Type,Sub Type))*Q+MIN_RANGE (Type,Sub Type), where Q is a constant.

In operation 434, for example, a fourth logic, such as the logic 240 of FIG. 2, receives and operates on the category, subcategory, and scope parameters to generate a score output. In more detail, the fourth logic executes the following function to generate the score output:

w4 Returns (if scope=Internal then D else E)+CAT-POINTS(category)+SUBCAT_POINTS(subcategory), where D and E are constants and CATPOINTS and SUBCAT_POINTS are point ranges defined for the system.

In operation 435, for example, a sum logic receives the outputs of the first through fourth logic modules, aggregates these scores (i.e., points), and generates a total score (i.e., total points) to complete operation 430.

Figure 6:
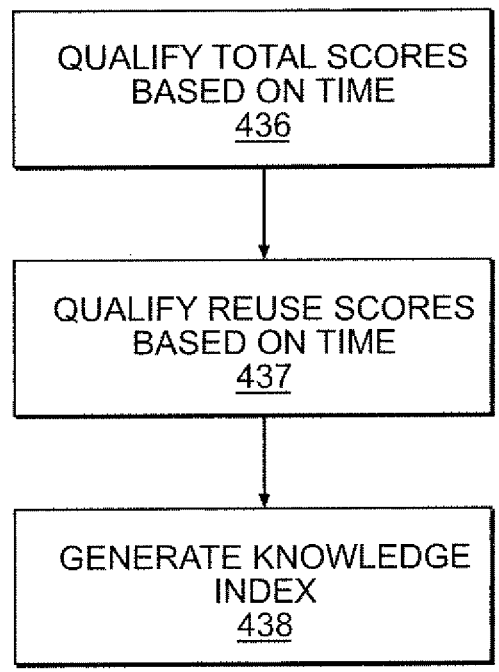
FIG. 6 is a detailed flow chart of operation 440 of the method of FIG. 5

Referring again to FIG. 4, after operation 430, in operation 440, parameter scores are compiled to generate a knowledge index. Operation 440 is illustrated in detail in FIG. 6, which shows that this operation includes the following operations: operation 436, qualifying knowledge artifacts based on the total score and time; operation 437, qualifying knowledge artifacts based on the reuse score and time; and operation 438, computing a user index.

In operation 436, for example, a fifth logic such as the logic 310 of FIG. 3, receives and operates on the total points and a time period for analysis value to generate a first qualification output. The qualification output qualifies only those knowledge artifacts that were submitted within the time period. Stated another way, operation 436 is an aggregator for qualified total scores.

In operation 437, for example, a sixth logic such as the logic 320 of FIG. 3, receives and operates on the reuse points for all knowledge artifacts used in a project and a time period for analysis value to generate a qualification output. Stated another way, operation 437 is an aggregator for qualified reuse scores.

In operation 438, for example a seventh logic such as the logic 330 of FIG. 3, receives and operates on the first and second qualification outputs using a specified hierarchy of analysis and a number of persons, to generate a knowledge index (Kcup index). This operation may be achieved using the following function to generate the knowledge index:

$w_7$ Returns (F*(Total_Points/No_Of_Persons))+(G*(Reuse_Points/No_Of_Persons))+(H*No_Of_Persons)+ (I*(Total_Points/No_Of_Artifacts/No_Of_Persons))+(J*Total_Points)+(K*Reuse_Points)+L, where F-L are constants.

It is to be appreciated the method described above is merely exemplary, and myriad modifications are both possible and contemplated. For example, other parameters may be received and used in addition to, or in place of, those discussed above. Further, various other systems may be used to practice the method.

Having discussed a system and method for obtaining a use index of a knowledge artifact, utilization of the index will be discussed.

FIG. 7 is an example of a knowledge index output by an embodiment of the present invention. Index 500, compiled in the manner described above, can be stored in a memory device of a computer. The index 500 can be stored in the form of a lookup table, a database, or in any other known format or scheme. As noted above, the index 500 includes knowledge index values generated as a result of logic 330 of FIG. 3. These index values can be stored in association with projects over time. As illustrated in FIG. 7, each project is identified by a unique ID (first column) in the index 500. The ID can be a number, name, or any other indicia designating a project. The second column stores the index values for the associated project at time T1. Subsequent columns store index values for subsequent times.

The index value is a relative value indicating how well the project is using knowledge. Accordingly, by recording index values over time for a project, it can be determined whether the project is improving with respect to knowledge use, remaining the same, or losing focus. For example, in FIG. 7, projects 1 and 2 are generally improving, and project 3 is remaining relatively steady. One might consider the decrease in index value in project one between T2 and T3 to be a flag to be watched. The index values of FIG. 7 have not been normalized across projects. However, such normalization could be accomplished to permit the index values to be used to make comparisons between different projects. The system can include alarms based on rules applied to the index values to warn of potential adverse occurrences in projects.

The index may be utilized to categorize knowledge artifacts and to identify areas where more external knowledge may be required. Such categorization, called "K-CUP Categorization" (KCC) is done for Knowledge Input and Knowledge Output.

Knowledge Input (Ki)=Knowledge used by the team from existing sources.

Knowledge Output (Ko)=Knowledge shared by the team for future use.

KCC=KCC(Ki)+KCC(Ko)

KCC(Ki)=Input Knowledge Artifact*f(Category, Sub Category, Type, Sub Type, Scope, Reuse)

Source for KCC=User Knowledge Action

Figure 8A:
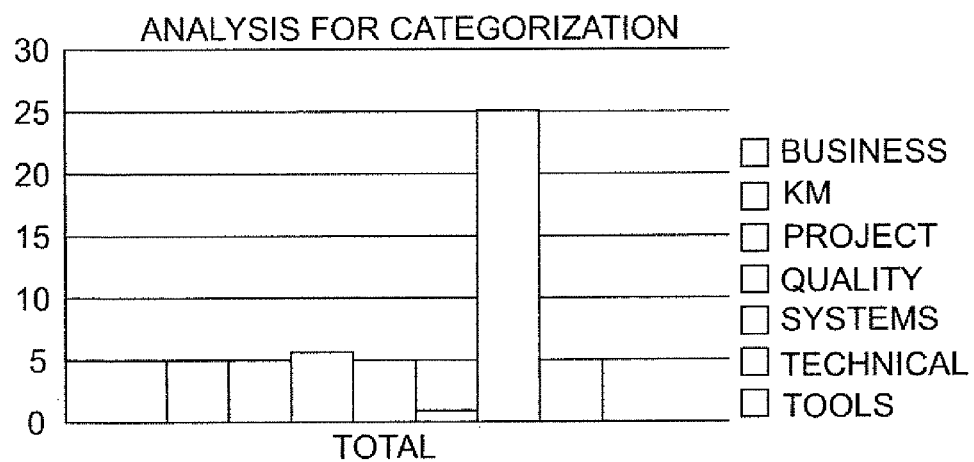
FIG. 8 is an example of a report of information output by an embodiment, with part (A) being an analysis for categorization, part (B) being an analysis for type, and part (C) being an analysis for sub-categorization.
Figure 8B:
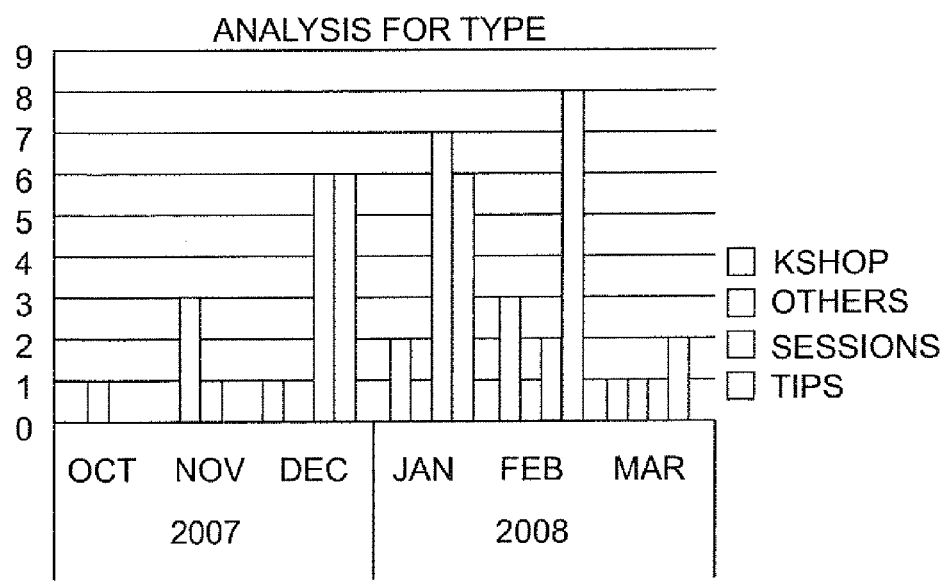
Figure 8C:
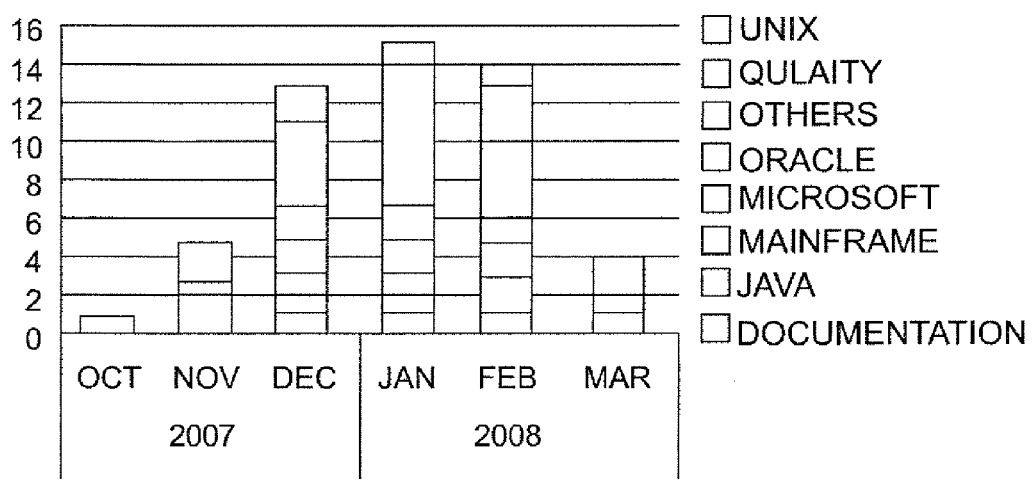

FIG. 8 illustrates reports that can be generated based on the scores described above and which can be used to manage use of knowledge. In part (A) of FIG. 8, the scores from a project are analyzed by category. By plotting scores as a function of category one can tell that, in the project, a great deal of focus has been on improving the technical skills of the team, because the technical category has scored very high relative to other categories. This might lead to a change in technical training resources within the team or the enterprise. In part (B) of FIG. 8, the scores from a project are plotted over time based on type. In this graph, it can be seen that there was relatively little use of knowledge in October and November, from December to February there is a large increase in "Kshop" submissions, i.e. documenting and sharing knowledge within the team. In part (C) of FIG. 8, the scores from a project are plotted over time based on the sub category. From this graph, it can be seen that there was a focus on documentation in December and January (possibly in response to an identified need for improved documentation skills). In December through February, there was a focus on mainframe knowledge. Accordingly, it can be seen that the scores and index can be used to discover how knowledge was used with very fine granularity and over various parameters.

The various scores can be compiled in various ways to ascertain various aspects of knowledge management. Various reports can be generated form which managers can ascertain useful information indicating the physical use of knowledge within projects. Also, the scores and index can be used as inputs into other systems, such as CRM systems, billing systems, or the like, to permit those systems to operate in a richer manner.

As can be seen from the foregoing, the knowledge management analysis may enable a user to quantify and measure information about how a specific knowledge artifact was used during a project. This measure may allow user to identify where an entity may be stronger in knowledge and where it might be weaker. This knowledge may help the entity more efficiently deploy resources and secure knowledge and talent.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a general-purpose microprocessor, the computer program code segments configure the microprocessor to create specific logic circuits.

Although embodiments of the present invention have been shown and described, it would be appreciated by those skilled in the art that changes may be made the these embodiments without departing from the principles and spirit of the invention, the scope of which is defined in the claims and their equivalents.

What is claimed is:

1. A method for analyzing use of knowledge artifacts during a project, comprising:
    obtaining, at a knowledge artifact analysis apparatus, one or more values for a plurality of use parameters for each of a plurality of knowledge artifacts, wherein the knowledge artifacts are each a memorialization of information in a retrievable format;
    generating, with the knowledge artifact analysis apparatus, one or more parameter scores based on one or more of the one or more values for each of the plurality of use parameters, for each of the plurality of knowledge artifacts, wherein the one or more parameter scores are selected from a reuse score, an effectiveness score, a base score, or a score output;
    generating, with the knowledge artifact analysis apparatus, a knowledge index value based at least in part on the one or more parameter scores, wherein the knowledge index value is a relative value indicative of how the plurality of knowledge artifacts were used during the project; and
    outputting, with the knowledge artifact analysis apparatus, one or more of the one or more of the parameter scores or the knowledge index value.

2. The method of claim 1, wherein the use parameters comprise one or more of a category of the knowledge artifact, a sub-category of the knowledge artifact, a type of the knowledge artifact, a sub-type of the knowledge artifact, a scope of the knowledge artifact, a reuse factor of the knowledge artifact, a number of persons, or an effectiveness factor of the knowledge artifact.

3. A method for analyzing use of knowledge artifacts during a project, comprising:
    obtaining, at an artifact evaluator module of a knowledge artifact analysis apparatus, one or more values for a plurality of use parameters for each of a plurality of knowledge artifacts, wherein the knowledge artifacts are each a memorialization of information and the use parameters comprise one or more of a category of the knowledge artifact, a sub-category of the knowledge artifact, a type of the knowledge artifact, a sub-type of the knowledge artifact, a scope of the knowledge artifact, a reuse factor of the knowledge artifact, a number of persons, and an effectiveness factor of the knowledge artifact;
    generating, with the artifact evaluator module of the knowledge artifact analysis apparatus, one or more parameter scores and a total score based on one or more of the one or more values for each of the plurality of use parameters, for each of the plurality of knowledge artifacts, wherein the one or more parameter scores are selected from a reuse score, an effectiveness score, a base score, or a score output and the reuse score is generated based on one or more values for the reuse factor of the knowledge artifact use parameter, the effectiveness score is generated based on one or more values for the type of the knowledge artifact, sub-type of the knowledge artifact, and effectiveness factor of the knowledge artifact use parameters, the base score is generated based on one or more values for the type of the knowledge artifact parameter, the score output is generated based on one or more values for the sub-category of the knowledge artifact, category of the knowledge artifact, and scope of the knowledge artifact use parameters, and a total score is generated based on an aggregation of at least the score output, the base score, the reuse score, and the effectiveness score; and
    generating, with the artifact evaluator module of the knowledge artifact analysis apparatus, one or more knowledge index values based at least in part on the one or more parameter scores, wherein the knowledge index value is indicative of use of the plurality of knowledge artifacts during the project.

4. The method of claim 3, wherein the generating one or more knowledge index values step is performed by a knowledge index calculator module of the knowledge artifact analysis apparatus and wherein the generating one or more knowledge index values step further comprises:
    aggregating a plurality of total scores of all knowledge artifacts used in the project;
    obtaining a time period for analysis;
    aggregating a plurality of reuse scores of all knowledge artifacts used in the project;
    qualifying at least one of the plurality of total scores for each knowledge artifact submitted during the time period for analysis;

qualifying at least one of the plurality of reuse scores for each knowledge artifact submitted during the time period for analysis; and generating the one or more knowledge index values based at least on the qualified total scores and qualified reuse scores.

5. A knowledge artifact analysis apparatus, comprising:

at least one processor; and memory coupled to the at least one processor which is configured to execute program instructions stored in the memory comprising:

obtaining one or more values for a plurality of use parameters for each of a plurality of knowledge artifacts, wherein the knowledge artifacts are each a memorialization of information in a retrievable format;

generating one or more parameter scores based on one or more of the one or more values for each of the plurality of use parameters, for each of the plurality of knowledge artifacts, wherein the one or more parameter scores are selected from a reuse score, an effectiveness score, a base score, or a score output;

generating a knowledge index value based at least in part on the one or more parameter scores, wherein the knowledge index value is a relative value indicative of how the plurality of knowledge artifacts were used during the project; and outputting one or more of the one or more of the parameter scores or the knowledge index value.

6. The apparatus of claim 5, wherein the use parameters comprise one or more of a category of the knowledge artifact, a sub-category of the knowledge artifact, a type of the knowledge artifact, a sub-type of the knowledge artifact, a scope of the knowledge artifact, a reuse factor of the knowledge artifact, a number of persons, or an effectiveness factor of the knowledge artifact.

7. A knowledge artifact analysis apparatus analyzing use of knowledge artifacts during a project, comprising:

at least one processor; and memory coupled to the at least one processor which is configured to execute program instructions stored in the memory comprising:

obtaining one or more values for a plurality of use parameters for each of a plurality of knowledge artifacts, wherein the knowledge artifacts are each a memorialization of information and the use parameters comprise one or more of a category of the knowledge artifact, a sub-category of the knowledge artifact, a type of the knowledge artifact, a sub-type of the knowledge artifact, a scope of the knowledge artifact, a reuse factor of the knowledge artifact, a number of persons, and an effectiveness factor of the knowledge artifact;

generating one or more parameter scores and a total score based on one or more of the one or more values for each of the plurality of use parameters, for each of the plurality of knowledge artifacts, wherein the one or more parameter scores are selected from a reuse score, an effectiveness score, a base score, or a score output and the reuse score is generated based on one or more values for the reuse factor of the knowledge artifact use parameter the effectiveness score is generated based on one or more values for the type of the knowledge artifact, sub-type of the knowledge artifact, and effectiveness factor of the knowledge artifact use parameters the base score is generated based on one or more values for the type of the knowledge artifact parameter the score output is generated based on one or more values for the sub-category of the knowledge artifact, category of the knowledge artifact, and scope of the knowledge artifact use parameters, and a total score is generated based on an aggregation of at least the score output, the base score, the reuse score, and the effectiveness score; and generating one or more knowledge index values based at least in part on the one or more parameter scores, wherein the knowledge index value is indicative of use of the plurality of knowledge artifacts during the project.

8. The apparatus of claim 7, wherein the generating one or more knowledge index values further comprises:

aggregating a plurality of total scores of all knowledge artifacts used in the project;

obtaining a time period for analysis;

aggregating a plurality of reuse scores of all knowledge artifacts used in the project;

qualifying at least one of the plurality of total scores for each knowledge artifact submitted during the time period for analysis;

qualifying at least one of the plurality of reuse scores for each knowledge artifact submitted during the time period for analysis; and generating the one or more knowledge index values based at least on the qualified total scores and qualified reuse scores.

9. A non-transitory computer readable medium having stored thereon instructions analyzing use of knowledge artifacts during a project comprising machine executable code which when executed by at least one processor, causes the processor to perform steps comprising:

obtaining one or more values for a plurality of use parameters for each of a plurality of knowledge artifacts, wherein the knowledge artifacts are each a memorialization of information in a retrievable format;

generating one or more parameter scores based on one or more of the one or more values for each of the plurality of use parameters, for each of the plurality of knowledge artifacts, wherein the one or more parameter scores are selected from a reuse score, an effectiveness score, a base score, or a score output;

generating a knowledge index value based at least in part on the one or more parameter scores, wherein the knowledge index value is a relative value indicative of how the plurality of knowledge artifacts were used during the project; and outputting one or more of the one or more of the parameter scores or the knowledge index value.

10. The medium of claim 9, wherein the use parameters comprise one or more of a category of the knowledge artifact, a sub-category of the knowledge artifact, a type of the knowledge artifact, a sub-type of the knowledge artifact, a scope of the knowledge artifact, a reuse factor of the knowledge artifact, a number of persons, or an effectiveness factor of the knowledge artifact.

11. A non-transitory computer readable medium having stored thereon instructions analyzing use of knowledge artifacts during a project comprising machine executable code which when executed by at least one processor, causes the processor to perform steps comprising:

obtaining one or more values for a plurality of use parameters for each of a plurality of knowledge artifacts, wherein the knowledge artifacts are each a memorialization of information and the use parameters comprise one or more of a category of the knowledge artifact, a sub-category of the knowledge artifact, a type of the knowledge artifact, a sub-type of the knowledge artifact, a scope of the knowledge artifact, a reuse factor of the knowledge artifact, a number of persons, and an effectiveness factor of the knowledge artifact;

generating one or more parameter scores and a total score based on one or more of the one or more values for each of the plurality of use parameters, for each of the plurality of knowledge artifacts, wherein the one or more parameter scores are selected from a reuse score, an effectiveness score, a base score, or a score output and the reuse score is generated based on one or more values for the reuse factor of the knowledge artifact use parameter, the effectiveness score is generated based on one or more values for the type of the knowledge artifact, sub-type of the knowledge artifact, and effectiveness factor of the knowledge artifact use parameters, the base score is generated based on one or more values for the type of the knowledge artifact parameter, the score output is generated based on one or more values for the sub-category of the knowledge artifact, category of the knowledge artifact, and scope of the knowledge artifact use parameters, and a total score is generated based on an aggregation of at least the score output, the base score, the reuse score, and the effectiveness score; and generating one or more knowledge index values based at least in part on the one or more parameter scores, wherein the knowledge index value is indicative of use of the plurality of knowledge artifacts during the project.

12. The medium of claim 11, wherein the generating one or more knowledge index values further comprises:

aggregating a plurality of total scores of all knowledge artifacts used in the project;

obtaining a time period for analysis;

aggregating a plurality of reuse scores of all knowledge artifacts used in the project;

qualifying at least one of the plurality of total scores for each knowledge artifact submitted during the time period for analysis;

qualifying at least one of the plurality of reuse scores for each knowledge artifact submitted during the time period for analysis; and generating the one or more knowledge index values based at least on the qualified total scores and qualified reuse scores.

\* \* \* \* \*